(12) United States Patent
Taghavi Nasrabadi et al.

(10) Patent No.: US 8,406,247 B2
(45) Date of Patent: Mar. 26, 2013

(54) MULTIPLE PEER-TO-PEER SIGNALING

(75) Inventors: Mohammad Hossein Taghavi Nasrabadi, San Diego, CA (US); Hemanth Sampath, San Diego, CA (US); Santosh P. Abraham, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 12/703,254

(22) Filed: Feb. 10, 2010

(65) Prior Publication Data

US 2011/0007676 A1    Jan. 13, 2011

Related U.S. Application Data

(63) Continuation-in-part of application No. 12/558,141, filed on Sep. 11, 2009, now Pat. No. 8,208,427.

(60) Provisional application No. 61/224,816, filed on Jul. 10, 2009.

(51) Int. Cl.
*H04L 12/28* (2006.01)
(52) U.S. Cl. ...................................................... 370/431
(58) Field of Classification Search .......... 370/310–350, 370/431–463
See application file for complete search history.

(56) References Cited

U.S. PATENT DOCUMENTS

| 7,916,081 | B2 * | 3/2011 | Lakkis | 342/367 |
| 2008/0134254 | A1 * | 6/2008 | Xia et al. | 725/62 |
| 2009/0042617 | A1 * | 2/2009 | Li et al. | 455/562.1 |
| 2009/0100317 | A1 * | 4/2009 | Lakkis | 714/783 |
| 2009/0122715 | A1 * | 5/2009 | Lakkis | 370/252 |
| 2010/0214169 | A1 * | 8/2010 | Kafle | 342/368 |
| 2011/0007640 | A1 * | 1/2011 | Taghavi Nasrabadi et al. | 370/252 |

FOREIGN PATENT DOCUMENTS

WO    WO2010056888    5/2010

OTHER PUBLICATIONS

Draft amendment to IEEE standard for Information technology—Part 15.3: Wireless Medium Access Control (MAC) and Physical Layer (PHY)Specifications for High Rate WirelessPersonal Area Networks ( WPANs ) : Amendment 2 IEEE Standard vol. P802.15c/D10, Jun. 1, 2009, XP002607604.
International Search Report and Written Opinion—PCT/US2010/041602, International Search Authority—European Patent Office—Nov. 12, 2010.

* cited by examiner

*Primary Examiner* — Fang Ng
(74) *Attorney, Agent, or Firm* — Dang M. Vo

(57) ABSTRACT

A method, an apparatus, and a computer program product operable in a wireless communication system are provided in which a first signal is generated for transmission to a wireless node to enable the wireless node to determine a first preferred beam pattern. A second preferred beam pattern is determined from a second signal received from the wireless node. The apparatus communicates with the wireless node through at least one of the first or second preferred beam pattern.

62 Claims, 3 Drawing Sheets

MULTIPLE PEER-TO-PEER SIGNALING

CROSS-REFERENCE TO RELATED APPLICATION(S)

This application is a continuation-in-part of U.S. patent application Ser. No. 12/558,141 filed on Sep. 11, 2009. Pursuant to 35 U.S.C. §119(e), this application claims the benefit of U.S. Provisional Application Ser. No. 61/224,816 filed on Jul. 10, 2009.

BACKGROUND

1. Field

The following description relates generally to communication systems and, more particularly, to multiple peer-to-peer signaling.

2. Background

In order to address the issue of increasing bandwidth requirements that are demanded for wireless communications systems, different technologies are being developed to allow multiple wireless nodes to communicate by sharing the channel resources while achieving high data throughputs. These technologies have been adopted in several emerging wireless communications standards, such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters). One example includes IEEE 802.11ad to support 60 Ghz. operation, which is sometimes referred as "Extremely High Throughput."

Various protocols exist for high throughput systems. One example is the IEEE 802.15.3c MAC protocol for wireless personal area networks (PAN). The 802.15.3c MAC protocol provides dedicated time-intervals for each pair of wireless nodes in a communications system to train with respect to each other, prior to data communication. However, as the number of peer-to-peer communications grows, this mechanism suffers from increased training overhead. There is a need to reduce peer-to-peer training overhead for high throughput systems, such IEEE 802.11ad systems and the like.

SUMMARY

In an aspect of the disclosure, an apparatus for wireless communication includes a processing system. The processing system is configured to generate a first signal for transmission to a wireless node to enable the wireless node to determine a first preferred beam pattern, to determine a second preferred beam pattern from a second signal received from the wireless node, and to communicate with the wireless node through at least one of the first or second preferred beam pattern.

In an aspect of the disclosure, a method for wireless communication includes generating a first signal for transmission to a wireless node to enable the wireless node to determine a first preferred beam pattern, determining a second preferred beam pattern from a second signal received from the wireless node, and communicating with the wireless node through at least one of the first or second preferred beam pattern.

In an aspect of the disclosure, an apparatus for wireless communication includes means for generating a first signal for transmission to a wireless node to enable the wireless node to determine a first preferred beam pattern, means for determining a second preferred beam pattern from a second signal received from the wireless node, and means for communicating with the wireless node through at least one of the first or second preferred beam pattern.

In an aspect of the disclosure, a computer-program product for communication includes a machine-readable medium including instructions executable to generate a first signal for transmission to a wireless node to enable the wireless node to determine a first preferred beam pattern, to determine a second preferred beam pattern from a second signal received from the wireless node, and to communicate with the wireless node through at least one of the first or second preferred beam pattern.

In an aspect of the disclosure, a station for wireless communication includes a processing system and a wireless interface. The processing system is configured to generate a first signal for transmission to a wireless node to enable the wireless node to determine a first preferred beam pattern, to determine a second preferred beam pattern from a second signal received from the wireless node, and to communicate with the wireless node through at least one of the first or second preferred beam pattern. The wireless interface has one or more antennas configured to support the first and second preferred beam patterns.

DETAILED DESCRIPTION

Figure 1:
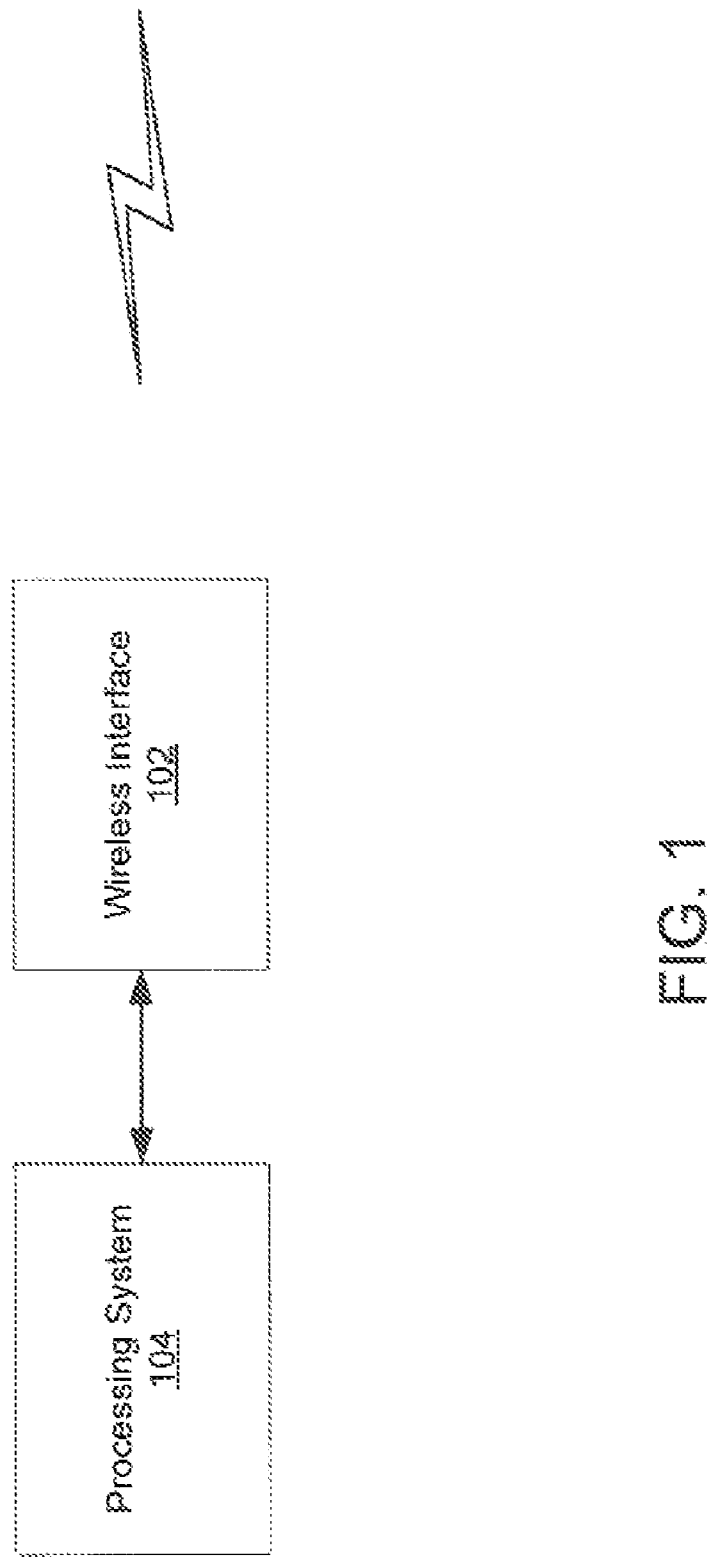
FIG. 1 is a conceptual block diagram illustrating the hardware configuration for an exemplary apparatus.

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Several aspects of a wireless communications system will now be presented. The wireless communications system may support any number of apparatuses. In this example, each apparatus is implemented as a wireless node. A wireless node may be a station (STA), or other suitable node.

The wireless communications system may be configured to support multiple STAs employing Multiple-Input and Multiple-Output (MIMO) technology supporting any suitable wireless technology, such as Orthogonal Frequency Division Multiplexing (OFDM). An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard. The various concepts presented throughout this disclosure may also be extended to short range radio technology, such as Ultra-Wide Band (UWB), or some other short range air interface standard such as Bluetooth. The actual wireless technology and air interface standard employed for any particular communications system will depend on the specific application and the overall design constraints imposed on the system. The various concepts presented throughout this disclosure are equally applicable to a wireless communications system employing other wireless technologies and/or air interface standards.

The wireless communications system may support any number of APs distributed throughout a geographic region. A STA, which may be fixed or mobile, engages in peer-to-peer communications with other STAs. Examples of STAs include a mobile telephone, laptop computer, a personal digital assistant (PDA), a mobile digital audio player, a mobile game console, a digital camera, a digital camcorder, a mobile audio device, a mobile video device, a mobile multimedia device, or any other suitable device capable of supporting wireless communications. A STA may utilize the backhaul services of an access point (AP) to gain access to a larger network (e.g., Internet).

A STA may be referred to by those skilled in the art by different nomenclature. By way of example, a STA may be referred to as a user terminal, a mobile station, a subscriber station, a wireless device, a terminal, an access terminal, a node, or some other suitable terminology. The various concepts described throughout this disclosure are intended to apply to all suitable apparatuses regardless of their specific nomenclature.

Various aspects of an apparatus will now be presented with reference to FIG. 1. FIG. 1 is a conceptual block diagram illustrating a hardware configuration for an apparatus. The apparatus 100 may include a wireless interface 102 and a processing system 104.

The wireless interface 102 may include a transceiver having a transmitter and receiver function to support two-way communications over the wireless medium. Alternatively, the wireless interface 102 may be configured as a transmitter or receiver to support one-way communications. In the detailed description that follows, a wireless interface may be described as a transmitter or a receiver to illustrate a particular aspect of the invention. Such a reference does not imply that the wireless interface is incapable of performing both transmit and receive operations.

The wireless interface 102 may support different air interface protocols. By way of example, the wireless interface 102 may include a 60 GHz HF radio to support IEEE 802.11 ad (Extremely High Throughput), or some other suitable air interface protocol. The wireless interface 102 may also be configured to implement the physical layer by modulating wireless signals and performing other radio frequency (RF) front end processing. Alternatively, the physical layer processing function may be performed by the processing system 104.

The wireless interface 102 is shown as a separate entity. However, as those skilled in the art will readily appreciate, the wireless interface 102, or any portion thereof, may be integrated into the processing system 104, or distributed across multiple entities within the apparatus 100.

The processing system 104 may be implemented with one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 104 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 102 to perform the various functions described below, as well as other protocol processing functions (e.g., data link layer processing).

Machine-readable media may include storage integrated into one or more of the processors. Machine-readable media may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

An example of multiple apparatuses operating in a wireless communications system will now be presented. In one example, the wireless communications system uses CDMA transmission to allow multiple pairs of STAs to simultaneously train with each other in a dedicated time-interval for peer-to-peer training. Such a scheme may substantially reduce control overhead in the 60 GHz system and improve MAC efficiency.

Figure 2:
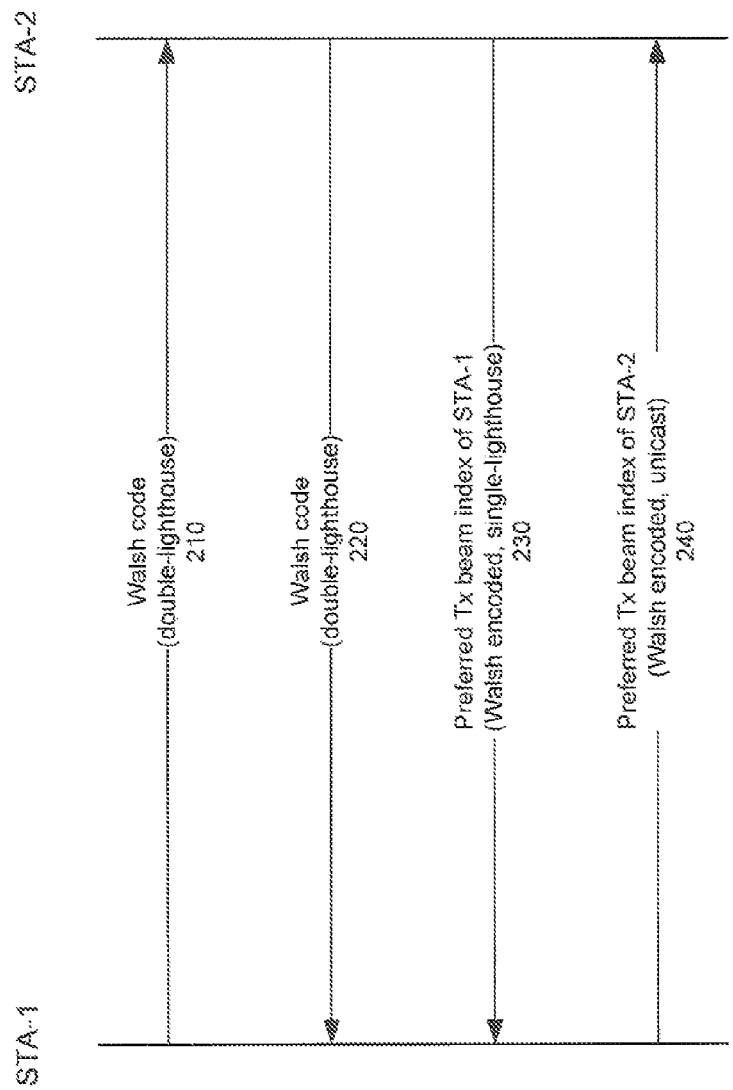
FIG. 2 is a flow diagram illustrating an example of a timeline for peer-to-peer training

FIG. 2 is a flow diagram illustrating an example of a timeline for peer-to-peer training for multiple STAs. Each STA includes a processing system 104 and a wireless interface 102. The AP reserves a dedicated time-interval for peer-to-peer training. The AP sends each STA a trainingSequenceID using unicast DL control frame message. Using the training-SequenceID, multiple pairs of STAs may perform peer-to-peer training simultaneously. A pair of STAs STA-1 and STA-2 perform peer-to-peer training as follows.

First, STA-1 transmits a Walsh or a Golay sequence (trainingSequenceID) of length L serially across $A_T$ transmit beam patterns (e.g., directions) supported by STA-2, $N_R$ times for each transmit beam pattern, where $N_R$ is the number of receive beam patterns supported by STA-2 (step 210). Such a transmission will be referred to as a "double-lighthouse" transmission. Assuming $A_T$ and $N_R$ are each 64, a system chip-rate of 1.7 Gps, a Walsh/Golay chip duration of 0.6 ns, and L=64, the total transmission time will be approximately 157 us (0.6 ns*64*64*64).

The training may be performed during a service period (i.e., allocation period) assigned by another wireless node. The service/allocation period is a dedicated period of time assigned by another wireless node for one or more pairs of wireless terminals to perform training. In one configuration, the training is performed using a code sequence selected from a set of code sequences that are also being used by one or more other pairs to perform training. That is, STA-1 selects a code sequence from a set of code sequences. The set of code sequences are also used by other pairs to perform training. The selection may be random or predetermined through an algorithm. In another configuration, the training is performing using a code sequence assigned by another wireless node (e.g., AP). In such a configuration, the code sequence is not being used by the one or more other pairs to perform training. That is, the code sequence transmitted by STA-1 is selected by another wireless node, such as an access point, and that code sequence is not being used by other pairs to perform training. As discussed supra, the code sequence may be a Walsh sequence or a Golay sequence.

For 60 GHz short-range PAN type networks, normally there are not more than 16 active stations per AP. As such, at any given peer-to-peer training time, no more than 8 pairs of STAs will engage in peer-to-peer training.

STA-2 receives the sequence from STA-1 and estimates the preferred (e.g., the best) transmit and receive beam patterns for STA-1 to STA-2 communication using Walsh/Golay correlation of the received waveform using the trainingSequenceID. As such, after step 210, STA-2 knows the preferred transmit and receive beam patterns for STA-1 to STA-2 communication.

Second, STA-2 transmits a Walsh or a Golay sequence (specified by trainingSequenceID) serially across $N_T$ transmit beam patterns supported by STA-2, $A_R$ times for each beam pattern (double-lighthouse), where $A_R$ is the number of receive beam patterns supported by STA-1 (step 220). Assuming $N_T$ and $A_R$ are each 64, a system chip-rate of 1.7 Gps, a Walsh/Golay chip duration of 0.6 ns, and L=64, the total transmission time will be approximately 157 us (0.6 ns*64*64*64).

STA-1 receives the sequence from STA-2 and estimates the preferred transmit and receive beam patterns for STA-2 to STA-1 communication using Walsh/Golay correlation of the received waveform using the trainingSequenceID. As such, after step 220, STA-1 knows the preferred transmit and receive beam patterns for STA-2 to STA-1 communication.

Third, STA-2 then sends a sequence corresponding to a 6-bit transmit beam index to STA-1 (step 230). The index indicates a preferred transmit beam pattern for STA-1 to STA-2 communication (i.e., one of the $A_T$ transmit beam patterns). STA-2 selects a length L Walsh or Golay sequence corresponding to the 6-bit index. STA-2 scrambles the length L sequence with a seed equal to the trainingSequenceID. The scrambling sequence generator can be according to section 12.2.2.10 of the IEEE 802.15.3c specification. STA-2 transmits this sequence serially across $N_T$ transmit beam patterns, only once for each transmit beam pattern. Because STA-1 knows the preferred receive beam pattern for STA-2 to STA-1 communication (i.e., one of the $A_R$ receive beam patterns), STA-1 uses its preferred receive beam pattern to receive the sequence. This transmission is referred to as a "single-lighthouse" transmission. Assuming L is 256, the total transmission time is approximately 10 us (0.6 ns*256*64). As such, after step 230, STA-1 knows the preferred transmit and receive beam patterns for STA-2 to STA-1 communication and the preferred transmit beam pattern for STA-1 to STA-2 communication.

Fourth, STA-1 sends a sequence corresponding to a 6-bit transmit beam index to STA-2 (step 240). The index indicates a preferred transmit beam pattern for STA-2 to STA-1 communication (i.e., one of the $N_T$ transmit beam patterns). STA-1 selects a length L Walsh or Golay sequence corresponding to the 6-bit index. STA-1 scrambles the length L sequence with a seed equal to the trainingSequenceID. The scrambling sequence generator can be according to section 12.2.2.10 of the 802.15.3c specification. STA-1 transmits the sequence through the preferred transmit beam pattern for STA-1 to STA-2 communication (i.e., one of the $A_T$ transmit beam patterns). Because STA-2 knows the preferred receive beam pattern for STA-1 to STA-2 communication, STA-2 uses its preferred receive beam pattern (i.e., one of the $N_R$ receive beam patterns) to receive the sequence. Assuming L equals 256, the total transmission time is approximately 150 ns (0.6 ns*256).

Figure 3:
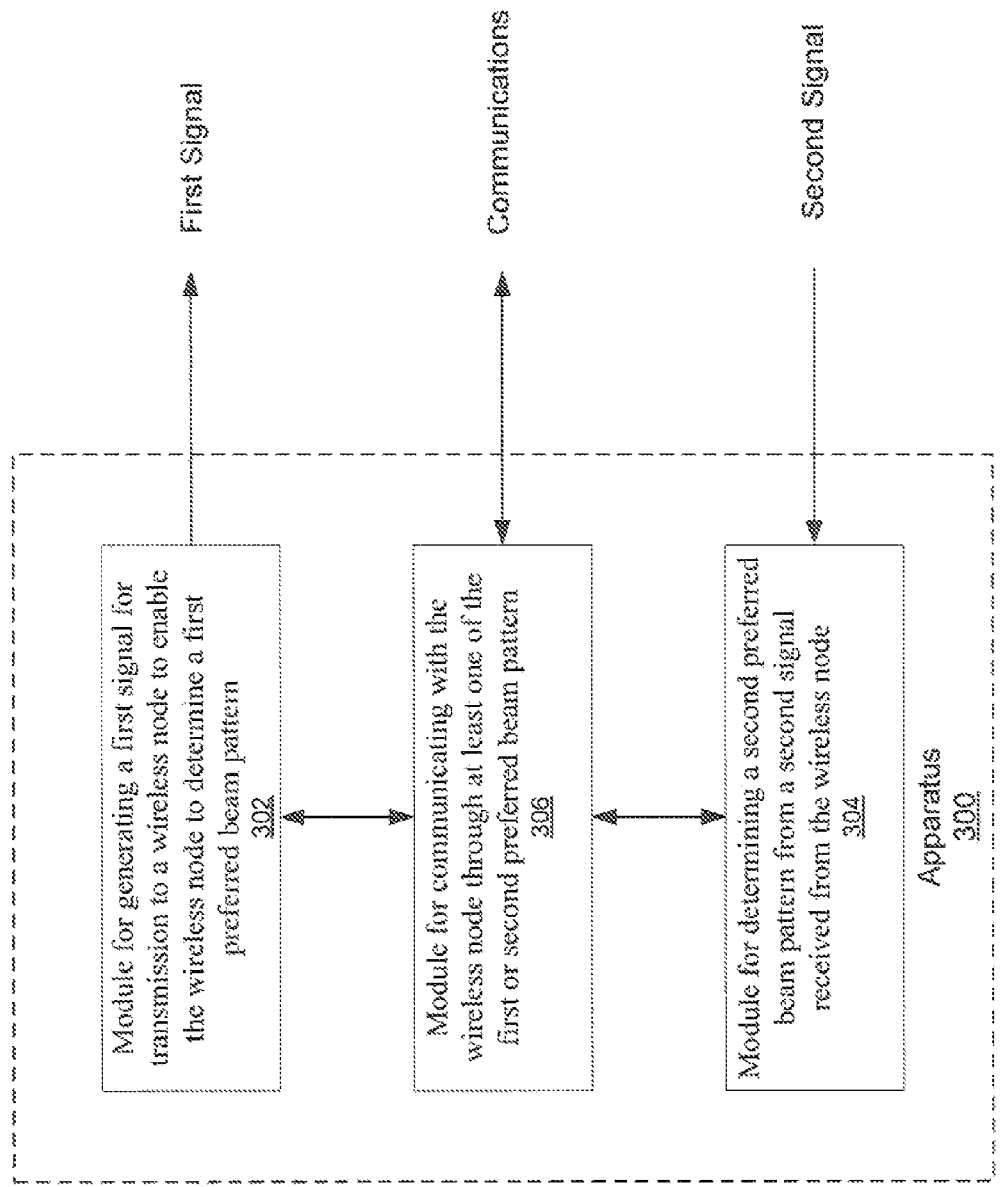
FIG. 3 is a conceptual block diagram illustrating the functionality of an exemplary apparatus.

FIG. 3 is a conceptual block diagram illustrating the functionality of an exemplary apparatus 300. The apparatus 300 includes a module 302 for generating a first signal for transmission to a wireless node to enable the wireless node to determine a first preferred beam pattern, a module 304 for determining a second preferred beam pattern from a second signal received from the wireless node, a module 306 for communicating with the wireless node through at least one of the first or second preferred beam pattern. In one configuration, the apparatus 300 includes a processing system 104 and the processing system 104 is configured to perform the functions of each of the modules 302-306. In one configuration, the first preferred beam pattern includes a preferred transmit beam pattern supported by the apparatus 300 and a preferred receive beam pattern supported by the wireless node; and the second preferred beam pattern includes a preferred transmit beam pattern supported by the wireless node and a preferred receive beam pattern supported by the apparatus 300. In one configuration, the apparatus 300 is configured to receive a third signal from the wireless node and to send a fourth signal to the wireless node. The third signal corresponds to the first preferred beam pattern and may correspond to the preferred transmit beam pattern supported by the apparatus. The fourth signal corresponds to the second preferred beam pattern and may correspond to the preferred transmit beam pattern supported by the wireless node. In another configuration, the apparatus 300 is configured to send a third signal to the wireless node and to receive a fourth signal from the wireless node. The third signal corresponds to the second preferred beam pattern and may correspond to the preferred transmit beam pattern supported by the wireless node. The fourth signal corresponds to the first preferred beam pattern and may correspond to the preferred transmit beam pattern supported by the apparatus.

In one configuration, the apparatus 300 includes means for generating a first signal for transmission to a wireless node to enable the wireless node to determine a first preferred beam pattern; means for determining a second preferred beam pattern from a second signal received from the wireless node; and means for communicating with the wireless node through at least one of the first or second preferred beam pattern. The aforementioned means is the processing system 104 configured to perform the functions of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for wireless communication, comprising:
a processing system configured to:
perform training comprising:
generating a first signal for transmission to a wireless node to enable the wireless node to determine a first preferred beam pattern; and
determining a second preferred beam pattern from a second signal received from the wireless node,
wherein the training is performed during a service period assigned by another wireless node not performing the training with the apparatus; and
communicate with the wireless node through at least one of the first or second preferred beam pattern.

2. The apparatus of claim 1, wherein:
the first preferred beam pattern comprises a preferred transmit beam pattern supported by the apparatus and a preferred receive beam pattern supported by the wireless node; and
the second preferred beam pattern comprises a preferred transmit beam pattern supported by the wireless node and a preferred receive beam pattern supported by the apparatus.

3. The apparatus of claim 2, wherein the processing system is further configured to receive a third signal corresponding to the first preferred beam pattern from the wireless node.

4. The apparatus of claim 3, wherein the processing system is further configured to receive the third signal, transmitted sequentially through different transmit beam patterns by the wireless node, through the preferred receive beam pattern supported by the apparatus.

5. The apparatus of claim 3, wherein the processing system is further configured to receive the third signal, transmitted through the preferred transmit beam by the wireless node, through the preferred receive beam pattern supported by the apparatus.

6. The apparatus of claim 3, wherein each of the first and second signals comprises the same training sequence, the processing system being further configured to decode the third signal with the training sequence.

7. The apparatus of claim 2, wherein the processing system is further configured to generate a third signal corresponding to the second preferred beam pattern for transmission to the wireless node.

8. The apparatus of claim 7, wherein the processing system is further configured to support the transmission of the third signal sequentially through different transmit beam patterns for reception by the wireless node signal through the preferred receive beam pattern.

9. The apparatus of claim 7, wherein the processing system is further configured to support the transmission of the third signal through the preferred transmit beam pattern supported by the apparatus for reception by the wireless node through the preferred receive beam pattern supported by the wireless node.

10. The apparatus of claim 7, wherein each of the first and second signals comprises the same training sequence, and wherein the processing system is further configured to generate the third signal by encoding a sequence corresponding to the second preferred beam pattern with the training sequence.

11. The apparatus of claim 1, wherein the processing system is configured to support the transmission of the first signal sequentially through different transmit beam patterns, one or more times through each of the different transmit beam patterns.

12. The apparatus of claim 1, wherein the processing system is further configured to:
support $A_T$ different transmit beam patterns; and
support the transmission of the first signal sequentially through the $A_T$ different transmit beam patterns, $N_R$ times through each of the $A_T$ different transmit beam patterns, wherein $N_R$ is the number of different receive beam patterns supported by the wireless node.

13. The apparatus of claim 1, wherein the processing system is further configured to:
support $A_R$ different receive beam patterns; and
receive the second signal sequentially through the $A_R$ different receive beam patterns, $N_T$ times though each of the $A_R$ different receive beam patterns, wherein $N_T$ is the number of different transmit beam patterns supported by the wireless node.

14. The apparatus of claim 1, wherein the processing system is further configured to perform the training with the wireless node, simultaneously as one or more other pairs of wireless nodes perform training.

15. The apparatus of claim 14, wherein the training is performed using a code sequence selected from a set of code sequences, the set of code sequences also being used by the one or more other pairs to perform training.

16. The apparatus of claim 15, wherein the code sequence comprises a Walsh sequence or a Golay sequence.

17. The apparatus of claim 14, wherein the training is performed using a code sequence assigned by the other wireless node, said code sequence not being used by the one or more other pairs to perform training.

18. The apparatus of claim 17, wherein the code sequence comprises a Walsh sequence or a Golay sequence.

19. The apparatus of claim 1, wherein the processing system is further configured to perform the training across at least one of time, frequency, or code dimensions.

20. The apparatus of claim 1, wherein the first signal comprises a Walsh sequence or a Golay sequence and the second signal comprises a Walsh sequence or a Golay sequence.

21. A method for wireless communication, comprising:
performing training comprising:
generating, at an apparatus, a first signal for transmission to a wireless node to enable the wireless node to determine a first preferred beam pattern; and
determining a second preferred beam pattern from a second signal received from the wireless node, wherein the training is performed during a service period assigned by another wireless node not performing the training with the apparatus; and communicating with the wireless node through at least one of the first or second preferred beam pattern.

22. The method of claim 21, wherein:

the first preferred beam pattern comprises a preferred transmit beam pattern supported by the apparatus and a preferred receive beam pattern supported by the wireless node; and the second preferred beam pattern comprises a preferred transmit beam pattern supported by the wireless node and a preferred receive beam pattern supported by the apparatus.

23. The method of claim 22, further comprising receiving a third signal corresponding to the first preferred beam pattern from the wireless node.

24. The method of claim 23, wherein the receiving of the third signal, which is transmitted sequentially through different transmit beam patterns by the wireless node, is through the preferred receive beam pattern supported by the apparatus.

25. The method of claim 23, wherein the receiving of the third signal, which is transmitted through the preferred transmit beam by the wireless node, is through the preferred receive beam pattern supported by the apparatus.

26. The method of claim 23, wherein each of the first and second signals comprises the same training sequence, the method further comprising decoding the third signal with the training sequence.

27. The method of claim 22, further comprising generating a third signal corresponding to the second preferred beam pattern for transmission to the wireless node.

28. The method of claim 27, further comprising supporting the transmission of the third signal sequentially through different transmit beam patterns for reception by the wireless node signal through the preferred receive beam pattern.

29. The method of claim 27, further comprising supporting the transmission of the third signal through the preferred transmit beam pattern supported by the apparatus for reception by the wireless node through the preferred receive beam pattern supported by the wireless node.

30. The method of claim 27, wherein each of the first and second signals comprises the same training sequence, and wherein the third signal is generated by encoding a sequence corresponding to the second preferred beam pattern with the training sequence.

31. The method of claim 21, further comprising supporting the transmission of the first signal sequentially through different transmit beam patterns, one or more times through each of the different transmit beam patterns.

32. The method of claim 21, further comprising:

supporting $A_T$ different transmit beam patterns; and supporting the transmission of the first signal sequentially through the $A_T$ different transmit beam patterns, $N_R$ times through each of the $A_T$ different transmit beam patterns, wherein $N_R$ is the number of different receive beam patterns supported by the wireless node.

33. The method of claim 21, further comprising:

supporting $A_R$ different receive beam patterns; and receiving the second signal sequentially through the $A_R$ different receive beam patterns, $N_T$ times though each of the $A_R$ different receive beam patterns, wherein $N_T$ is the number of different transmit beam patterns supported by the wireless node.

34. The method of claim 21, wherein the training is performed simultaneously as one or more other pairs of wireless nodes perform training.

35. The method of claim 34, wherein the training is performed using a code sequence selected from a set of code sequences, the set of code sequences also being used by the one or more other pairs to perform training.

36. The method of claim 35, wherein the code sequence comprises a Walsh sequence or a Golay sequence.

37. The method of claim 34, wherein the training is performed using a code sequence assigned by the other wireless node, said code sequence not being used by the one or more other pairs to perform training.

38. The method of claim 37, wherein the code sequence comprises a Walsh sequence or a Golay sequence.

39. The method of claim 21, wherein the training is performed across at least one of time, frequency, or code dimensions.

40. The method of claim 21, wherein the first signal comprises a Walsh sequence or a Golay sequence and the second signal comprises a Walsh sequence or a Golay sequence.

41. An apparatus for wireless communication, comprising:

means for performing training comprising:

means for generating a first signal for transmission to a wireless node to enable the wireless node to determine a first preferred beam pattern; and means for determining a second preferred beam pattern from a second signal received from the wireless node, wherein the training is performed during a service period assigned by another wireless node not performing the training with the apparatus; and means for communicating with the wireless node through at least one of the first or second preferred beam pattern.

42. The apparatus of claim 41, wherein:

the first preferred beam pattern comprises a preferred transmit beam pattern supported by an apparatus and a preferred receive beam pattern supported by the wireless node; and the second preferred beam pattern comprises a preferred transmit beam pattern supported by the wireless node and a preferred receive beam pattern supported by the apparatus.

43. The apparatus of claim 42, further comprising means for receiving a third signal corresponding to the first preferred beam pattern from the wireless node.

44. The apparatus of claim 43, wherein the means for receiving receives the third signal, which is transmitted sequentially through different transmit beam patterns by the wireless node, through the preferred receive beam pattern supported by the apparatus.

45. The apparatus of claim 43, wherein the means for receiving receives the third signal, which is transmitted through the preferred transmit beam by the wireless node, through the preferred receive beam pattern supported by the apparatus.

46. The apparatus of claim 43, wherein each of the first and second signals comprises the same training sequence, the apparatus further comprising means for decoding the third signal with the training sequence.

47. The apparatus of claim 42, further comprising means for generating a third signal corresponding to the second preferred beam pattern for transmission to the wireless node.

48. The apparatus of claim 47, further comprising means for supporting the transmission of the third signal sequentially through different transmit beam patterns for reception by the wireless node signal through the preferred receive beam pattern.

49. The apparatus of claim 47, further comprising means for supporting the transmission of the third signal through the preferred transmit beam pattern supported by the apparatus for reception by the wireless node through the preferred receive beam pattern supported by the wireless node.

50. The apparatus of claim 47, wherein each of the first and second signals comprises the same training sequence, and wherein the third signal is generated by encoding a sequence corresponding to the second preferred beam pattern with the training sequence.

51. The apparatus of claim 41, further comprising means for supporting the transmission of the first signal sequentially through different transmit beam patterns, one or more times through each of the different transmit beam patterns.

52. The apparatus of claim 41, further comprising:
means for supporting $A_T$ different transmit beam patterns; and
means for supporting the transmission of the first signal sequentially through the $A_T$ different transmit beam patterns, $N_R$ times through each of the $A_T$ different transmit beam patterns, wherein $N_R$ is the number of different receive beam patterns supported by the wireless node.

53. The apparatus of claim 41, further comprising:
means for supporting $A_R$ different receive beam patterns; and
means for receiving the second signal sequentially through the $A_R$ different receive beam patterns, $N_T$ times though each of the $A_R$ different receive beam patterns, wherein $N_T$ is the number of different transmit beam patterns supported by the wireless node.

54. The apparatus of claim 41, wherein the training is performed simultaneously as one or more other pairs of wireless nodes perform training.

55. The apparatus of claim 54, wherein the training is performed using a code sequence selected from a set of code sequences, the set of code sequences also being used by the one or more other pairs to perform training.

56. The apparatus of claim 55, wherein the code sequence comprises a Walsh sequence or a Golay sequence.

57. The apparatus of claim 54, wherein the training is performed using a code sequence assigned by the other wireless node, said code sequence not being used by the one or more other pairs to perform training.

58. The apparatus of claim 57, wherein the code sequence comprises a Walsh sequence or a Golay sequence.

59. The apparatus of claim 41, wherein the training is performed across at least one of time, frequency, or code dimensions.

60. The apparatus of claim 41, wherein the first signal comprises a Walsh sequence or a Golay sequence and the second signal comprises a Walsh sequence or a Golay sequence.

61. A computer-program product for communication, comprising:
a readable storage device encoded with instructions executable to:
perform training comprising:
generating, at an apparatus, a first signal for transmission to a wireless node to enable the wireless node to determine a first preferred beam pattern; and
determining a second preferred beam pattern from a second signal received from the wireless node,
wherein the training is performed during a service period assigned by another wireless node not performing the training with the apparatus; and
communicate with the wireless node through at least one of the first or second preferred beam pattern.

62. A station for wireless communication, comprising:
a processing system configured to:
perform training comprising:
generating a first signal for transmission to a wireless node to enable the wireless node to determine a first preferred beam pattern; and
determining a second preferred beam pattern from a second signal received from the wireless node,
wherein the training is performed during a service period assigned by another wireless node not performing the training with the station; and
communicate with the wireless node through at least one of the first or second preferred beam pattern; and
a wireless interface having one or more antennas configured to support the first and second preferred beam patterns.

* * * * *